(12) United States Patent
Moss

(10) Patent No.: US 7,819,416 B2
(45) Date of Patent: *Oct. 26, 2010

(54) STOWAWAY, RECEIVER HITCH

(76) Inventor: Newell Ryan Moss, 1662 W. 1200 North, North Mapleton, UT (US) 84664

( * ) Notice: Subject to any disclaimer, the term of this patent is extended or adjusted under 35 U.S.C. 154(b) by 330 days.

This patent is subject to a terminal disclaimer.

(21) Appl. No.: 11/787,653

(22) Filed: Apr. 17, 2007

(65) Prior Publication Data

US 2008/0258433 A1 Oct. 23, 2008

Related U.S. Application Data

(63) Continuation of application No. 10/260,019, filed on Oct. 2, 2002, now Pat. No. 7,204,505, which is a continuation of application No. 09/559,603, filed on Apr. 27, 2000, now Pat. No. 6,460,870.

(60) Provisional application No. 60/162,259, filed on Oct. 29, 1999.

(51) Int. Cl.
  *B60D 1/54* (2006.01)
(52) U.S. Cl. .................... 280/491.1; 280/491.3
(58) Field of Classification Search .............. 280/491.1, 280/491.3, 511
See application file for complete search history.

(56) References Cited

U.S. PATENT DOCUMENTS

| | | | |
|---|---|---|---|
| 2,221,278 A | | 11/1940 | Utterback |
| 2,544,185 A | * | 3/1951 | Sargent .................... 280/491.2 |
| 2,547,299 A | | 4/1951 | Williams |
| 2,576,383 A | | 11/1951 | Avery |
| 2,604,331 A | | 7/1952 | Kingston |
| 2,733,936 A | * | 2/1956 | Tate ........................ 280/491.3 |
| 2,823,930 A | | 2/1958 | Cooper |
| 2,838,327 A | * | 6/1958 | Collins .................... 280/491.2 |

(Continued)

FOREIGN PATENT DOCUMENTS

BE 715681 10/1968

(Continued)

OTHER PUBLICATIONS

Boating Life, p. 89, Sep./Oct. 1999.

(Continued)

*Primary Examiner*—Lesley Morris
*Assistant Examiner*—Daniel Yeagley
(74) *Attorney, Agent, or Firm*—Traskbritt

(57) ABSTRACT

A trunnion, adapted to fit in a receiver, attached to a vehicle as a receiver-type hitch system, provides selective deployment and stowage of a hitch. An optional base secured to the trunnion may receive a pivot. A mount, secured by the pivot to the base, swings between a deployed and a stowed position. Alignments are one-dimensional, typically circumferentially positioning a locking pin aperture and a corresponding locking pin about a radius with respect to a pivot axis. A platform of the mount may contain an aperture for operating as a pin hitch aperture or for receiving a stud or bolt for securing a ball hitch or two hitches. In certain embodiments, multiple ball hitches may be attached at once to the platform. Selection of ball hitch sizes and positioning of the ball hitch altitude may also be accomplished by pivots built into the mount.

8 Claims, 5 Drawing Sheets

U.S. PATENT DOCUMENTS

| | | | |
|---|---|---|---|
| 2,849,243 A | 8/1958 | Halverson | |
| 2,872,213 A | 2/1959 | Hosford | |
| 2,889,155 A | 6/1959 | Sandage | |
| 3,117,805 A | 1/1964 | Schoeffler | |
| 3,400,949 A | 9/1968 | Kendall | |
| 3,630,546 A | 12/1971 | Church | |
| 3,640,550 A * | 2/1972 | Pearson | 280/491.3 |
| 3,655,221 A | 4/1972 | Warner | |
| 3,664,686 A | 5/1972 | Anderson | |
| 3,717,362 A * | 2/1973 | Johnson | 280/416.1 |
| 3,734,540 A | 5/1973 | Thiermann | |
| 3,751,072 A | 8/1973 | Williams | |
| 3,779,653 A | 12/1973 | Charlton | |
| 3,801,134 A * | 4/1974 | Dees | 280/416.1 |
| 3,891,238 A | 6/1975 | Ehlert | |
| 3,922,006 A | 11/1975 | Borges | |
| 3,963,266 A | 6/1976 | Thelin | |
| 3,979,138 A | 9/1976 | George et al. | |
| 4,022,490 A | 5/1977 | Rocksvold | |
| 4,033,601 A | 7/1977 | Lindahl et al. | |
| 4,208,065 A | 6/1980 | Hansen | |
| 4,232,877 A | 11/1980 | Milton | |
| 4,248,450 A | 2/1981 | McWethy | |
| 4,275,899 A | 6/1981 | Humphrey | |
| 4,456,279 A | 6/1984 | Dirck | |
| 4,482,167 A | 11/1984 | Haugrud | |
| 4,492,386 A | 1/1985 | Roberts | |
| 4,568,098 A | 2/1986 | Landry, Jr. | |
| 4,610,457 A | 9/1986 | Harmon | |
| 4,662,647 A * | 5/1987 | Calvert | 280/490.1 |
| 4,697,818 A | 10/1987 | Moore | |
| 4,711,461 A | 12/1987 | Fromberg | |
| 4,721,324 A | 1/1988 | Blacklaw | |
| 4,758,015 A | 7/1988 | Pixley | |
| 4,772,039 A | 9/1988 | Cook | |
| 4,792,153 A | 12/1988 | Galdes | |
| 4,807,899 A | 2/1989 | Belcher | |
| 4,807,900 A * | 2/1989 | Tate | 280/491.3 |
| 4,844,498 A | 7/1989 | Kerins et al. | |
| 4,938,496 A | 7/1990 | Thomas et al. | |
| 4,944,525 A | 7/1990 | Landry | |
| 4,951,957 A | 8/1990 | Gullickson | |
| 5,000,473 A | 3/1991 | Johnson | |
| 5,033,764 A | 7/1991 | Blacklaw | |
| 5,088,754 A | 2/1992 | Skelton | |
| 5,106,114 A | 4/1992 | Haupt | |
| 5,135,247 A * | 8/1992 | Alfaro et al. | 280/415.1 |
| 5,288,095 A | 2/1994 | Swindall | |
| 5,312,128 A | 5/1994 | Blacklaw | |
| 5,322,313 A * | 6/1994 | Schroeder | 280/416.1 |
| 5,322,315 A | 6/1994 | Carsten | |
| 5,332,250 A | 7/1994 | Thorwall et al. | |
| 5,351,982 A | 10/1994 | Walrath | |
| 5,375,867 A | 12/1994 | Kass et al. | |
| 5,413,366 A | 5/1995 | Gibbons | |
| 5,465,991 A | 11/1995 | Kass et al. | |
| 5,503,423 A | 4/1996 | Roberts et al. | |
| 5,547,210 A * | 8/1996 | Dugger | 280/477 |
| 5,560,630 A | 10/1996 | Phares et al. | |
| 5,580,088 A * | 12/1996 | Griffith | 280/479.2 |
| 5,725,229 A | 3/1998 | McWethy | |
| 5,727,805 A | 3/1998 | La Roque | |
| 5,741,022 A | 4/1998 | Wass et al. | |
| 5,806,872 A | 9/1998 | Szczypski | |
| 5,839,744 A * | 11/1998 | Marks | 280/416.1 |
| 5,857,693 A | 1/1999 | Clark, Jr. | |
| 5,860,669 A | 1/1999 | Wass et al. | |
| 5,871,222 A | 2/1999 | Webb | |
| 5,890,727 A | 4/1999 | May | |
| D409,124 S | 5/1999 | Bank | |
| 5,906,387 A | 5/1999 | Wallace | |
| 5,915,714 A * | 6/1999 | Bell et al. | 280/456.1 |
| 5,934,698 A | 8/1999 | Despain | |
| 5,975,553 A | 11/1999 | Van Vleet | |
| 6,092,827 A * | 7/2000 | Korpi et al. | 280/514 |
| 6,116,633 A | 9/2000 | Pride | |
| 6,139,043 A | 10/2000 | Gries et al. | |
| 6,142,238 A | 11/2000 | Holt et al. | |
| 6,149,181 A | 11/2000 | Biederman | |
| 6,189,910 B1 * | 2/2001 | Bartel | 280/491.2 |
| 6,460,870 B2 | 10/2002 | Moss | |
| 6,481,739 B1 | 11/2002 | Newkirk | |
| 6,511,086 B2 | 1/2003 | Schlicht | |
| 6,712,381 B1 | 3/2004 | Moss | |
| 6,789,815 B2 | 9/2004 | Moss et al. | |
| 6,857,650 B2 | 2/2005 | Ward | |
| 6,974,148 B2 | 12/2005 | Moss et al. | |
| 7,004,492 B2 | 2/2006 | Moss et al. | |
| 7,204,505 B2 * | 4/2007 | Moss | 280/491.1 |

FOREIGN PATENT DOCUMENTS

| | | |
|---|---|---|
| DE | 3639183 | 8/1987 |
| FR | 2227739 | 11/1974 |
| FR | 2450167 | 10/1980 |

OTHER PUBLICATIONS

Trailer Boats, p. 90, Sep. 1999.
Herrington, The Enthusiasts Catalog, p. 1, memorial Day '00.
Northern Took & Equipment Co., pp. 278-281, Summer 2000.
JC Whitney Catalog, Business Edition Catalog No. 630B, pp. 79-81.
PCT International Search Report, dated Apr. 6, 2003.

* cited by examiner

STOWAWAY, RECEIVER HITCH

CROSS-REFERENCE TO RELATED APPLICATIONS

This application is a continuation of U.S. patent application Ser. No. 10/260,019, filed Oct. 2, 2002, which will issue as U.S. Pat. No. 7,204,505 on Apr. 17, 2007, which is a continuation of U.S. patent application Ser. No. 09/559,603, filed Apr. 27, 2000, now U.S. Pat. No. 6,460,870, issued Oct. 8, 2002, which application claims the benefit of earlier-filed U.S. Patent Application Ser. No. 60/162,259, filed Oct. 29, 1999, abandoned, for "Stowaway, Receiver Hitch." The disclosure of each of the previously referenced U.S. patent applications and patents is hereby incorporated by reference in its entirety.

BACKGROUND

1. The Field of the Invention

This invention relates to towing apparatus and, more particularly, to novel systems and methods for receiver-type hitches on vehicles to tow trailers.

2. The Background Art

Trailers have been towed since the earliest days of the wheel. A cart or wagon towed behind an animal is a trailer. In modern times, trailers are secured to towing vehicles by a multiplicity of methods. Tractor-trailer rigs use fifth-wheel towing systems. Similarly, recreational vehicles sometimes use fifth-wheel towing systems.

A continuing popular apparatus for securing a towed vehicle to a towing vehicle is the "receiver hitch." A receiver hitch relies on a receiver cavity or tube securely mounted to the frame of a towing vehicle. The receiver is reinforced and provided with an aperture for receiving a trunnion. A trunnion may be secured into the receiver. A hitch may be mounted on the trunnion. Typically, the hitch may be a pin hitch or a ball hitch, but need not be limited thereto.

For recreational users, receiver hitches present two common problems. The more important problem may be the difficulty of attaching a greasy hitch to a vehicle and unattaching the same after use. Although receiver-type hitches are generally adaptable to receive various trunnions with various types of hitches, the very nature of a receiver hitch may make it problematic. If a trunnion is not removed after use, then a person may accidentally strike a shin or knee on the extending hitch or trunnion when no towed vehicle is attached. If the hitch is removed, it is cumbersome to move, requires some immediate storage place, and may be filthy with grease. Due to the weight of the hitch and trunnion assembly, a person removing the trunnion and hitch from a receiver is likely to soil clothing.

Another problem with receiver hitches is the adjustment of altitude of the hitch itself. Recreational users may have multiple towed vehicles. For example, a boat trailer, a snowmobile trailer, a utility hauling trailer, and the like may be manufactured at different and arbitrary hitch heights. Similarly, a trunnion may be used on different vehicles having different heights. Accordingly, it may be advantageous to provide a hitch that is easily adjustable between multiple positions of elevation.

Thus, it would be an advance in the art to provide a receiver-type hitch mount that can be stowed without projecting inconveniently far from the bumper, substantially within the envelope of a vehicle, or even without extending behind the bumper on certain embodiments. Ready access and substantial weightless or self-supporting deployment of a hitch mount is extremely desirable. However, any adjustability in altitude would be a plus.

Along with an adjustment in altitude, it is common to use different sizes of ball hitches. Accordingly, selective stowage and presentation, selectivity of multiple sizes of ball hitches on a single mount without having to use a wrench to replace the ball hitch, alone or in combination, would be a benefit and convenience.

BRIEF SUMMARY AND OBJECTS OF THE INVENTION

In view of the foregoing, it is a primary object of the present invention to provide a mount mechanism for a receiver-type hitch system. The mount should be deployable and stowable at the election of a user. The mount and hitch system should be supportable on a trunnion of a conventional receiver-type hitch system without adaptation thereof. Moreover, the hitch mount system should fit within an envelope or footprint close to that of the vehicle itself. This may reduce the hazards of walking or working near the rear of a vehicle.

It is an additional object of the invention to provide access to multiple levels of hitch height and multiple hitch sizes such as ball diameters. It is a further object of the invention to provide an option to select among hitch heights, deployment and stowage options, and hitch sizes, without requiring substantial lifting of the weight of the trunnion and mount system.

It is another object of the invention to provide a mechanism that does not require substantial effort for alignment by the user in order to be adjusted between a deployed and stowed position, between a first altitude and a second altitude, or between a first and second hitch size.

Consistent with the foregoing objects and in accordance with the invention as embodied and broadly described herein, an apparatus is disclosed in suitable detail to enable one of ordinary skill in the art to make and use the invention. In certain embodiments, an apparatus in accordance with the present invention may include a trunnion connecting to a pivot. The pivot connects a base to a hitch. A base supports a mount which may be moved between a stowed and a deployed position and may include a platform for supporting a hitch. A beam may enable the main pivotal member to rotate or pivot about the base. Usually, the base may be fixed with respect to the trunnion.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the system and method of the present invention, as represented in FIGS. 1 through 8, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the figures may easily be made without departing from the essential characteristics of the invention. Thus, the following description of the figures is intended only by way of example and simply illustrates certain presently preferred embodiments consistent with the invention as claimed.

Figure 1:
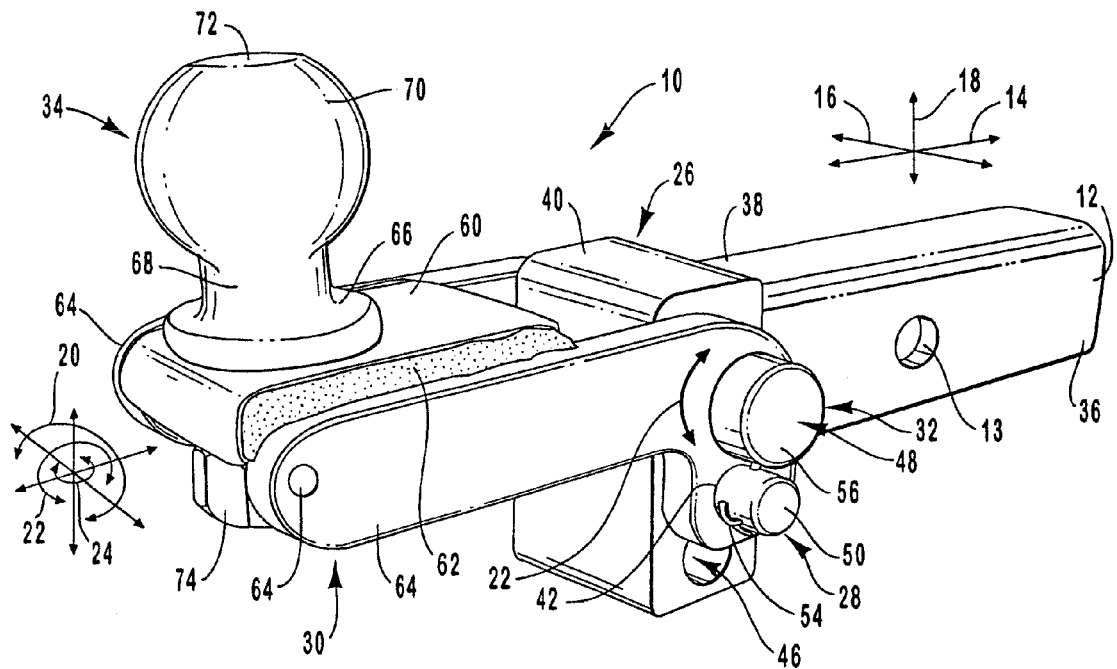
FIG. 1 is a rear quarter perspective view (with respect to the front-to-rear orientation of a vehicle) of one embodiment of a receiver-type hitch-mounting mechanism in a deployed position in accordance with the present invention.

Referring to FIG. 1, specifically, while also referring generally to FIGS. 1-8, an apparatus or hitch mount 10 may be secured to a receiver of a towing vehicle. The apparatus 10 may include a trunnion 12 adapted to slidably fit within a receiver in a comparatively snug, supported, locked position. In general, a pin aperture 13, or simply an aperture 13, through the trunnion 12 may receive a pin (not shown) for locking the trunnion 12 with respect to a receiver (not shown).

The trunnion 12 of the apparatus 10 may define certain directions 14-24. The directions 14-24 may also define, or be defined by, a vehicle orientation. A longitudinal direction 14 extends in the direction that the trunnion 12 will typically be oriented. A lateral direction 16 is substantially orthogonal to the longitudinal direction 14. The longitudinal direction 14 and lateral direction 16 define a substantially horizontal plane with respect to a vehicle on a level surface. Of course, all directions 14-24 may be aligned with an arbitrary set of reference directions. Accordingly, horizontal and vertical have meaning only by way of example and not by way of limitation.

A transverse direction 18 is substantially orthogonal to the longitudinal direction 14 and the lateral direction 16. The transverse direction 18 and the longitudinal direction 14 may form or define a first vertical plane. The lateral direction 16 and transverse direction 18 may together define a different vertical plane orthogonal to the first.

With respect to each of the directions 14, 16, 18, rotational directions 20, 22, 24, respectively, may be useful in describing the apparatus 10. A circumferential direction 20 may describe arcs formed with respect to an axis extending in the axis 14 or longitudinal direction 14. The circumferential direction 22 may describe arcs formed about the lateral axis 16 or direction 16. The circumferential direction 24 may describe arcs formed about the transverse axis 18 or direction 18. As will be clear from the circumferential directions 20, 22, 24, the directions 14, 16, 18 may alternatively be referred to as axes 14, 16, 18, respectively.

A trunnion 12 may have a portion thereof defined as a base 26. Alternatively, a base 26 may actually include a plate, bar, beam, or other structure for strengthening the trunnion 12. Also, the base 26 may provide a means for attaching a pivot 28 to the trunnion 12. The pivot 28 may be secured to the trunnion, may be independent therefrom, or may be a removable device 28. In one embodiment, the pivot 28 is a pin 28 received in and through the base 26.

A mount 30, secured by the pivot 28, is movable with respect to the base 26. Typically, the mount 30 pivots about the base 26 and about the pivot 28 in a circumferential direction 22 in the embodiment of FIG. 1.

For convenience, a pivot 28 may be left attached effectively permanently to the base 26. Likewise, the pivot 28 may secure permanently the mount 30 to the base 26. In one embodiment, the pivot 28 is removable, but may, as a practical matter, not need to be removed except to perhaps modify the mount 30.

By leaving the mount 30 secured by the pivot 28 to the base 26, a lock 32 (sometimes referred to herein as a locking pin) may be easily engaged. The lock 32 may require alignment in a single direction, the circumferential direction 22 about a lateral direction 16. By promoting and including tolerances suitable for easy alignment, the apparatus 10 may have a lock 32 represented by a single shaft, or the like, to fix the mount 30 with respect to the base 26 and the pivot 28.

A principal function of the mount 30 is to support a hitch 34. The hitch 34 may be a ball-type hitch. The hitch 34 is desirably attached opposite the receiver or vehicle end 36 of the trunnion 12 at the load or operational end 38.

Figure 2:
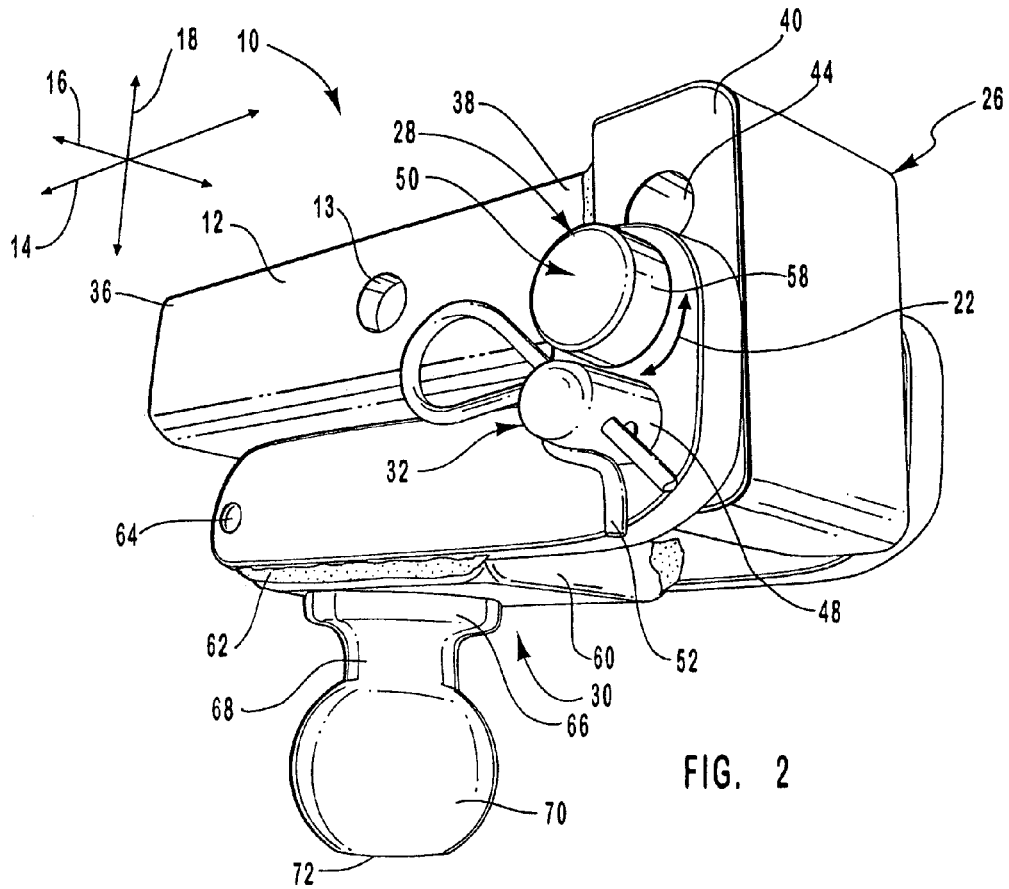
FIG. 2 is a lower rear quarter perspective view of the apparatus of FIG. 1, in a stowed position.

Referring to FIG. 2, while continuing to refer to FIG. 1, and more generally to FIGS. 1-8, a base 26 may be embodied in a block 40. The block 40 may be drilled, machined, or otherwise worked to provide an aperture or pivot aperture 42 therethrough in a direction 14, 16, 18. In the illustrated embodiment, the aperture 42 extends in a lateral direction 16.

A deployment aperture or aperture 44 may extend in a direction parallel to that of the pivot aperture 42 in order to receive a lock 32 for securing the mount 30 in a deployed position. In the embodiment of FIGS. 1 and 2, a stowage aperture 46 opposed to the deployment aperture 44 may receive a lock 32 or locking pin 48 therethrough to secure the mount 30 in a stowed position.

The lock 32 in certain embodiments may be little more than a pin 48 and the pivot 28 may likewise be a suitably sized and fabricated pin 50. The pins 48, 50 may be secured by a lynch pin 52 or other type of keeper 54, respectively. A nut, locknut, key, pin, clip, or other securement mechanism may serve the function of the lynch pin 52 or keeper 54 in securing the pins 48, 50.

In one embodiment, the pin 48 may have a head 56. The head 56 may be integrally formed with the pin 48 or may be welded thereto, threaded thereon, or the like. In one embodiment, the pin 48 may be a monolithic piece of steel of suitable strength and toughness, with the head 56 integrally formed thereon. Similarly, the pivot 28, embodied as a pin 50, may include a head 58. The heads 56, 58 preclude the pins 48, 50 from experiencing excessive motion in a lateral direction 16 in their corresponding apertures 42, 44, 46.

A platform 60 may have an aperture (not shown) to act as a pin hitch point or to receive a stud or bolt (not shown) securing the hitch or ball hitch 34 to the platform 60. The platform 60 may be secured to the mount 30, or as part of the mount 30 by means of a fastener or weld 62, such as the weld 62 illustrated.

In one embodiment, a principal portion of the mount 30 may be formed as a beam or pair of beams 64. In operation and in order to accommodate the geometry of the trunnion 12, the pin aperture 13, and so forth, as well as the receiver (not shown) that will receive the trunnion 12, the beam 64 may have a corner 65. Thus, the beam 64 may angle between the base 26 and the platform 60 at some suitable orientation. In the embodiments illustrated in FIGS. 3 and 4 the beams 64 have corners 65 formed at right angles. By contrast, the beam 64 in the embodiment of FIGS. 5 and 6 may be formed at a different angle. The angle of the corner 65 may be formed according to good engineering practice and to improve the functionality of the beam 64 in pivoting the mount 30 about the base 26, without interference with other portions of the apparatus 10.

The hitch 34 may be a conventional ball hitch. For example, the hitch 34 may have a base 66 formed to fit against the platform 60. Extending above the base 66 may be an integral or fabricated shank 68. The shank 68 in a forged hitch 34 is of the same homogeneous material as the ball 70. In other embodiments, worked metals, such as hot- or cold-worked steel, may be combined in a fabrication to make a base 66, a shank 68, and a ball 70. Nevertheless, in one presently preferred embodiment, the base 66, shank 68 extending therefrom, and the ball 70 may be formed as a single integral (monolithic), uniform piece.

Typically, a ball 70 may have a flat 72 to provide clearance with a hitch of a towed vehicle. Thus, the load bearing member is supported in all three directions 14, 16, 18 by the ball 70 itself. Accordingly, the ball also provides a pivot mechanism. Typically, a hitch 34 may be secured by a stud or bolt (not shown) mounted to the base 66 and secured by a nut 74 opposite the ball 70 through the platform 60. In certain embodiments, a safety loop may receive a bolt or chain as required by law in some states or a locking pin for orientation during fabrication.

Figure 3:
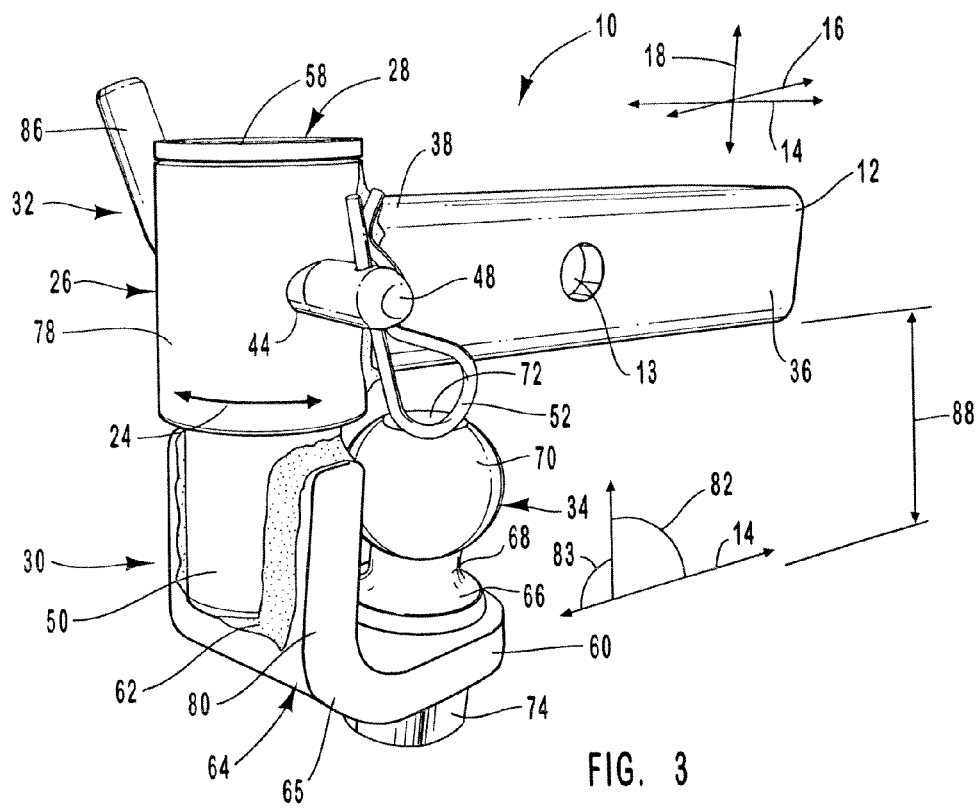
FIG. 3 is a rear quarter perspective view of an alternative embodiment of an apparatus in accordance with the present invention for implementing a hitch-mounting mechanism in a stowed position.
Figure 4:
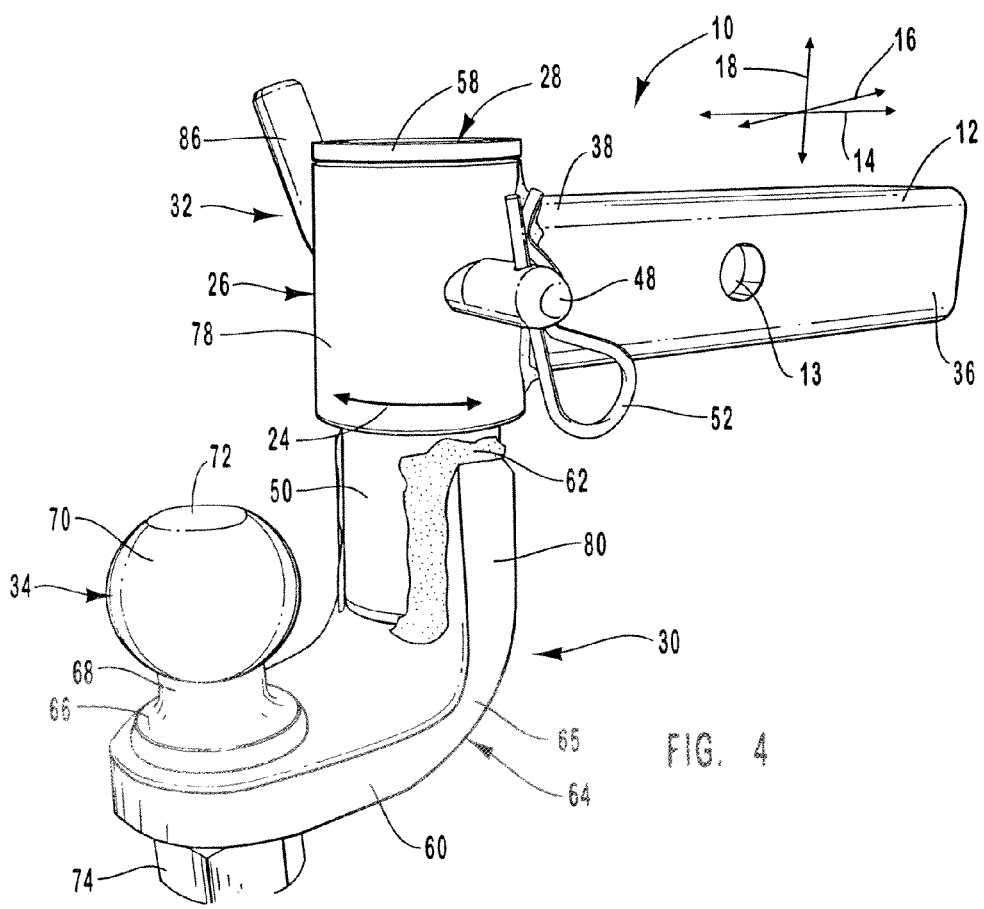
FIG. 4 is a rear quarter perspective view of the apparatus of FIG. 3 in a deployed position.

Referring to FIGS. 3 and 4, while continuing to refer generally to FIGS. 1-8, the apparatus 10 may include a base 26 that is not rectangular. For example, the pivot 28 securing the mount 30 to the base 26 and trunnion 12 may itself be cylindrical. The mount 30 may have a lock 32 that uses or relies upon a single deployment aperture 44. For example, a stowage aperture 46 (FIG. 1) may actually be identical to the deployment aperture 44, but the orientation of the mount 30 about the pivot 28 changes between a deployed position (see FIG. 4) and a stowed position (see FIG. 3).

As illustrated, the hitch 34 may still be positioned selectively between a stowed position and a deployed position. The pivot 28, however, may rely on a pin 50 having more functions in certain alternative embodiments. For example, the pin 50 may support the loads in all directions 14-24. By contrast, the loading in the apparatus 10 of FIGS. 1 and 2 is somewhat more complex.

The concept of a lynch pin 52 or keeper 54 (FIG. 1) may still be relied upon. Likewise, a head 58 on the pivot 28 (pivot pin 50 being a specific embodiment) may support a load in a transverse direction 18, rather than providing retainage in a lateral direction 16. Nevertheless, as a practical matter, the locking pin 32 may support loads in the transverse direction 18 depending upon the design of clearances between the head 58 and the cylinder 78 of the base 26. Likewise, the clearance between the locking pin 32 and the aperture 44 through the cylinder 78 and the pin 50 may be significant.

The beam 64 may be monolithic, rather than multiple beams 64 of previously described embodiments. The beam 64 may include a corner 65 in order to orient the platform 60 suitably, while providing clearance for pivoting the hitch 34 between a stowed position (see FIG. 3) and a deployed position (see FIG. 4). The beam 64 may include a riser or riser portion 80 angled at some interior angle 82 or exterior angle 83 with respect to the platform 60 (see FIG. 6).

For convenience, any of the pins 48, 50 may include a handle 86 for manipulation. When tolerances or clearances are tight, some rotation of a pin 48, 50 may be beneficial in order to remove or insert the pin 48, 50. One additional point concerning the head 58 of the pin 50 is that the head 58 may be either removable or integral. Since the locking pin 32 actually secures the position of the pivot 28 no great risk is presented by the head 58 being threaded or otherwise secured to the pin 50 rather than being secured monolithically. Thus, the pin 50 may be replaceable by one of different length (e.g. height) to provide a desired offset 88 in various embodiments of the apparatus 10 manufactured or sold.

Figure 5:
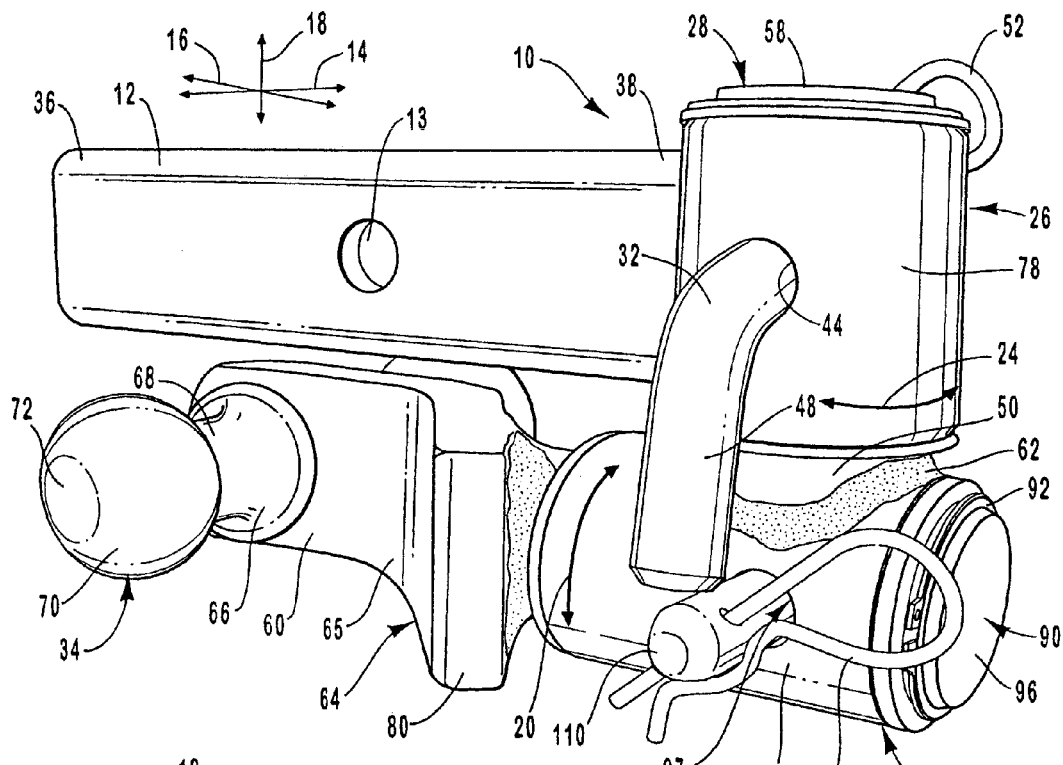
FIG. 5 is a rear quarter perspective view of an alternative embodiment of a receiver-type hitch-mounting mechanism in accordance with the present invention in a stowed position.
Figure 6:
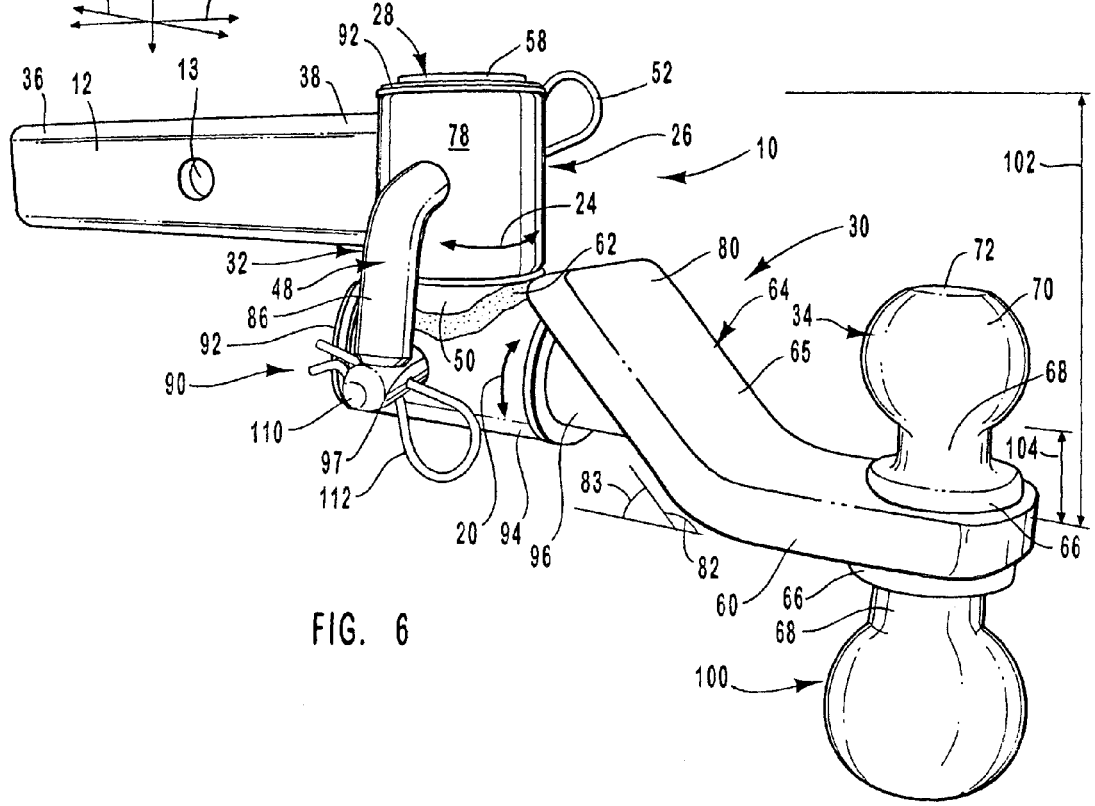
FIG. 6 is a rear quarter perspective view of the apparatus of FIG. 5 in a deployed position.

Referring to FIGS. 5 and 6 while continuing to refer generally to FIGS. 1-8, an apparatus 10 having a first member, such as a trunnion 12 mounted to a base 26, securing a second member, such as a pivot 28 rotatable about a transverse axis 18 in a circumferential direction 24, may rely on a lock 32. The lock 32 may secure the pivot 28 between a stowed position (see FIG. 5) and a deployed position (see FIG. 6). In the illustrated embodiment, the pin 50 forms a principal element of the pivot 28 in conjunction with the cylinder 78 forming the principal portion of the base 26. A third member, such as the mount 30, may include an additional or second pivot 90. In this embodiment, a more compact profile may position the hitch 34 higher with respect to the trunnion 12 and base 26, providing more ground clearance between the mount 30 and the ground.

In this alternative embodiment, a fastener or weld 62, such as a weld 62, may secure the pivot 90. The pivot 90 may include a housing 94 receiving a pin 96 therethrough to pivot. The pin 96 may be retained by a keeper 92, such as a lock ring 92 as illustrated, or the like. Again, the keeper 92 may secure the pin 96 against excessive movement or escape from the housing 94. Nevertheless, during actual deployment, the security and load bearing to maintain the pin 96 in position are actually the responsibility of the second pin 110 kept in place by a lynch pin or other keeper 112. Bolts, pins, latches, and other fastening mechanisms may substitute for any of the locks 32. Nevertheless, as a practical matter, pins 48, 110, as well as the head 58 and pivot pin 96, may be fashioned in any manner suitable for efficient manufacture and function.

In one embodiment, the aperture 97 may extend through the housing 94 and the pin 96 at a single location. Nevertheless, in the embodiment of FIGS. 5 and 6, the aperture 97 may extend through the pin 96 along mutually orthogonal axis therethrough. Accordingly, the pin 96 may be rotated between a position of deployment with a first ball 70 up and useable and a second deployed position with a second ball 100 up and useable.

In one embodiment, the pivot 28 may rotate the mount 30 to position the ball 70 directly under the trunnion 12 in a stowed position. In an alternative embodiment, the aperture 97 may actually comprise two apertures, positioned at angles substantially orthogonal to one another, through the pin 96. Thus, the mount 30 may be rotated at right angles along a longitudinal axis 14 and locked there by the pin 110. Thereafter, the mount 30 may be rotated about a transverse axis 18 of the pin 50, to position the mount 30 under the trunnion 12.

Thus, the movement of the mount 30 between a deployed position and a stowed position may include two rotations or pivots and two locks 32, 110.

One may note that an offset 88 (FIG. 3) characterizing a distance between a platform 60 and a trunnion 12 may be selected in any embodiment of a hitch. However, in certain embodiments, an apparatus 10 in accordance with the invention may provide an offset 102 between the trunnion and the platform 60 or an offset 104 between some dimension or center of the pin 96 and the platform 60. Thus, the offset 104 may be reversed by rotation of the pin 96, placing the ball 100 in the upper position with the hitch 34 in the lower position. Thus, the offset 104 may actually be reversed by a rotation on the pin 96. If the ball 70 and the ball 100 are of different sizes, alternative balls may be mounted-on the same mount 30. If the balls 70, 100 are of identical size, the rotation of the pivot pin 96 may provide an elevation difference. Thus, both elevation and ball size may be selectively varied by a user.

A mount 30 pivotably secured to a base 26 portion of a trunnion 12 may support a platform 60. The platform 60 may receive a bolt or stud for securing thereto a hitch 34, such as balls 70, 100. In certain embodiments, a beam 64 may be formed as part of the mount 30 in order to provide both the pivoting function and the attachment to the base 26 simultaneously with attachment to the hitch. The apparatus may include one or more pins 48, 50, 96, 110 for pivoting the mount 30 with respect to the base 26, and portions of the mount 30 with respect to other portions of the mount 30, in order to selectively stow and deploy the hitch 34. In selected embodiments, additional pivots within the mount mechanism may provide virtually instantly adjustable height of the hitch, without a need for a user to separate load-bearing members of the apparatus 10 from one another. Likewise, a user need not support any substantial portion of the weight of apparatus 10 in order to selectively deploy and stow or to selectively position the hitch 34.

Figure 7:
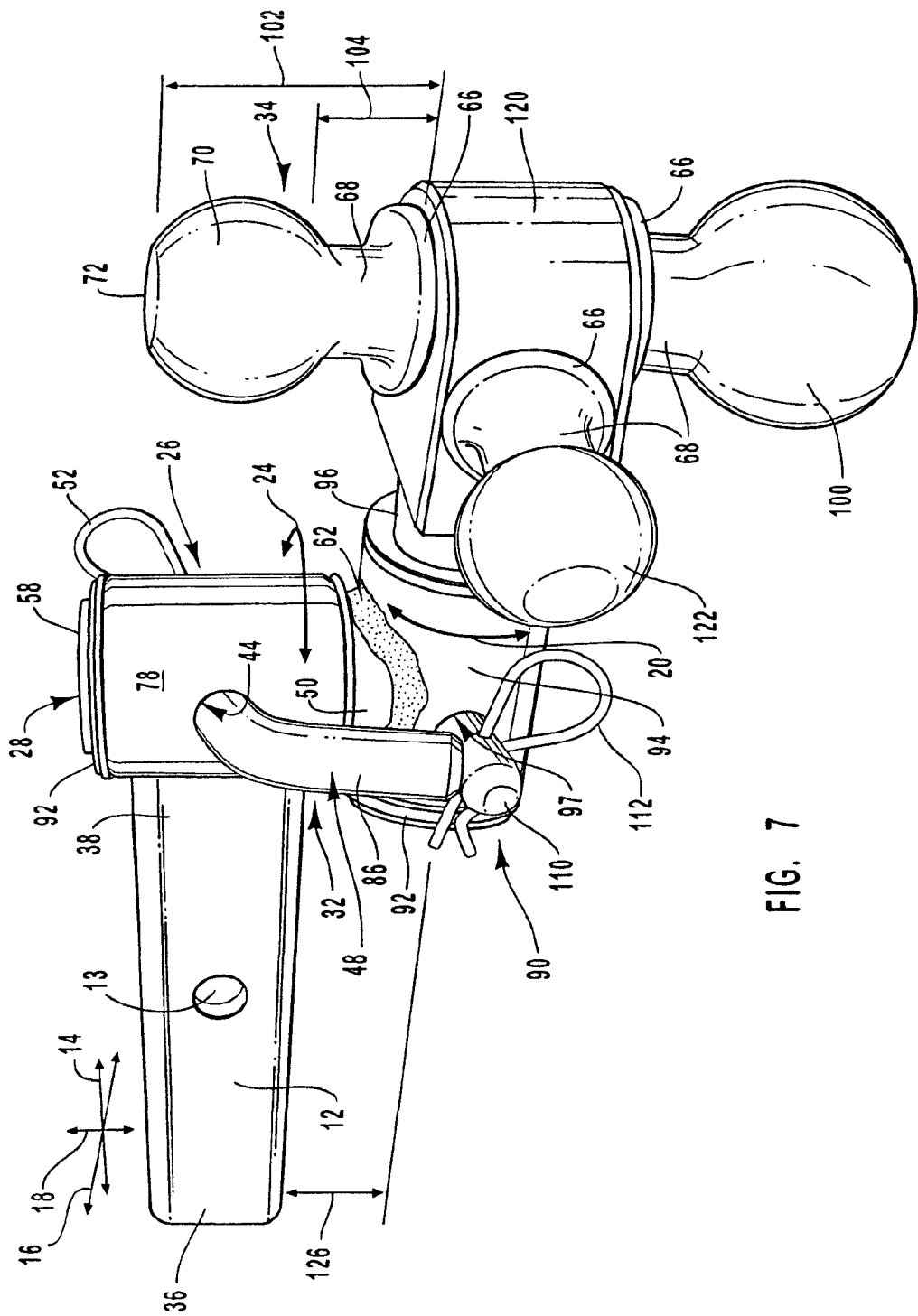
FIG. 7 is a rear quarter perspective view of an alternative embodiment of a receiver-type hitch mounting mechanism in a deployed position in accordance with the present invention.
Figure 8:
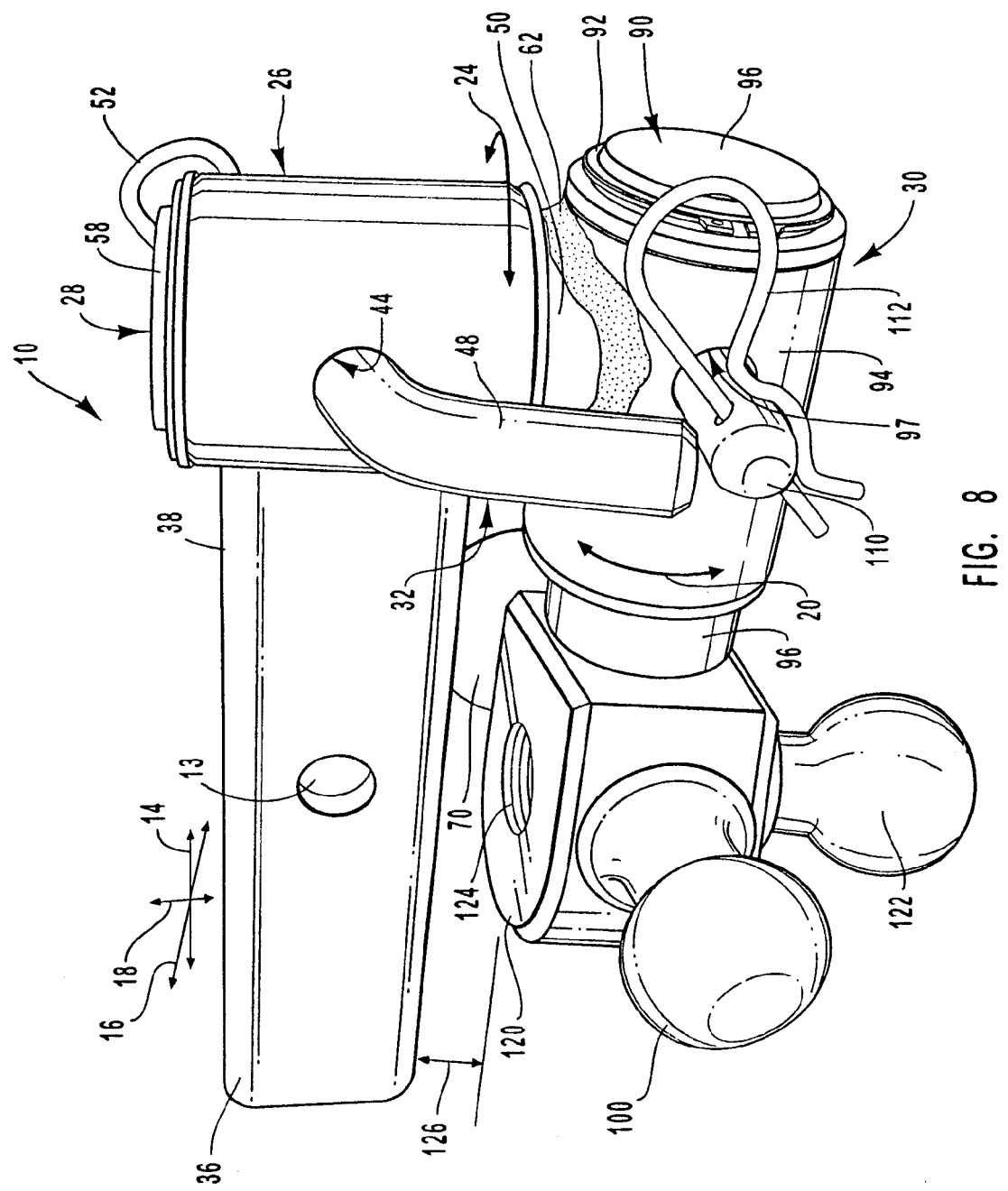
FIG. 8 is a rear quarter perspective view of the apparatus of FIG. 7 in a stowed position.

Referring to FIGS. 7 and 8, while continuing to refer generally to FIGS. 1-8, an apparatus 10 having a trunnion 12 supports a pivot 28 rotatable about a transverse axis 18 in a circumferential direction 24. A lock 32 may secure the pivot 28 between a stowed position and a deployed position. The pin 50 or pivot 50 supports rotation with respect to the trunnion 12.

In this embodiment, a fastener or weld 62, such as a weld 62, may secure a variety of pivots 90 including a housing 94 with a pin 96 for locking. As discussed hereinbefore, the pin 96 may be retained against excessive movement or escape. Similarly, deployment security and load bearing rely on the second pin 110 secured by a lynch pin or other keeper 112. Again, bolts, pins, latches, and other fasteners may substitute.

The aperture 97 may extend through the housing 94 and the pin 96 at a single location. In the configuration illustrated, the pin 96 may rotate a mounting block 120 between several positions of deployment. For example, the block 120 may present a first ball 70 oriented to protrude up for use. Alternatively, a second deployment position may present a second ball 100. Similarly a third ball 122, or more, may secure to one or more apertures 124 in the block 120.

In one embodiment, the pivot 28 may rotate the block 120 of the mount 30 to position the balls 70, 100, 122 directly under the trunnion 12 in a stowed position. The size and geometry of the pin 50 maybe configured to provide a distance 126 or clearance 126 for accepting the block 120 with or without a ball therebetween.

The aperture 97 need only comprise two apertures 97, or one for each pair of positions (hitches) provided. Thus, the mount 30 may be rotated at right angles along a longitudinal axis 14 and locked there by the pin 110. Rotating about a transverse axis 18 of the pin 50 positions the mount 30 under the trunnion 12. As with the simpler version, movement between a deployed position and a plurality of stowed positions may be accomplished by only two rotations and two locking pins 32, 110.

In the embodiment of FIGS. 7 and 8, the block 120 need not be symmetrical. Thus, offsets 102, 104, or the like may be built into any dimension of the block 120 to provide various heights for balls 70, 100, 122. Balls 70, 100, 122 may be of different sizes, positioned at different heights, or both. That is, balls 70, 100, 122 of different sizes may be pivoted into position selectively. Alternatively, offsets 102, 104 may position balls 70, 100, 122 at different heights. Alternatively, certain of the balls 70, 100, 122 may be of identical size, others of different sizes, with all positionable by rotation of the pivot pin 96 to provide the predetermined choice of balls 70, 100, 122 and height selected by a user.

From the above discussion, it will be appreciated that the present invention provides a trunnion supporting a base. On the base, a pivot secures a mount that may be selectively positioned between a stowed and a deployed position.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. An apparatus for coupling a towed vehicle with a towing vehicle, the apparatus comprising:
    a first member extending in a first direction and configured for slidable engagement along the first direction with a receiver of a towing vehicle;
    a second member having a first end thereof secured to the first member;
    a third member adjustably coupled with the second member, the third member having a plurality of hitch members coupled therewith, the third member being selectively positionable to and securable in at least one towing position wherein at least one of the plurality of hitch members is presented for coupling with a towed vehicle, and the third member being selectively positionable to and securable in at least one stowed position wherein at least one hitch member of the plurality of hitch members is positioned directly under the first member and none of the plurality of hitch members are accessible for coupling with a towed vehicle when slidably engaged with a receiver of a towing vehicle, and wherein the plurality of hitch members are selectively positionable relative to the second member so as to selectively present a desired hitch member of the plurality of hitch members to a towed vehicle.

2. The apparatus of claim 1, further comprising at least one lock configured to retain the third member in the at least one towing position.

3. The apparatus of claim 1, further comprising at least one lock configured to retain the third member in the at least one stowed position.

4. The apparatus of claim 1, wherein the plurality of hitch members are pivotally coupled with the third member.

5. The apparatus of claim 1, wherein the third member is pivotally coupled with the second member.

6. The apparatus of claim 1, wherein the plurality of hitch members includes two ball hitches extending in opposing directions from one another.

7. The apparatus of claim 1, wherein the plurality of hitch members are disposed substantially adjacent the first member when in the at least one stowed position.

8. The apparatus of claim 1, wherein the second member is disposed between the first member and the plurality of hitch members when the third member is disposed in the at least one towing position.

* * * * *

UNITED STATES PATENT AND TRADEMARK OFFICE
CERTIFICATE OF CORRECTION

| | |
|---|---|
| PATENT NO. | : 7,819,416 B2 |
| APPLICATION NO. | : 11/787653 |
| DATED | : October 26, 2010 |
| INVENTOR(S) | : Newell Ryan Moss |

Page 1 of 1

It is certified that error appears in the above-identified patent and that said Letters Patent is hereby corrected as shown below:

On the title page:
In ITEM (56) References Cited
U.S. PATENT DOCUMENTS
Page 2, 1st column, 35th entry (line 37)   change "4,772,039 A" to --4,722,039 A--
Page 2, 2nd column, 37th entry (line 37)   change "2/2006" to --2/2002--

In the specification:
COLUMN 7,   LINE 62,   change "maybe" to --may be--
COLUMN 8,   LINE 54,   change "members are" to --members is--
COLUMN 8,   LINE 65,   change "members are" to --members is--
COLUMN 9,   LINE 5,    change "members are" to --members is--

Signed and Sealed this
Twenty-first Day of June, 2011

David J. Kappos
*Director of the United States Patent and Trademark Office*